(12) United States Patent
Biswas et al.

(10) Patent No.: US 12,481,727 B2
(45) Date of Patent: Nov. 25, 2025

(54) USER ACCEPTANCE TEST SYSTEM FOR MACHINE LEARNING SYSTEMS

(71) Applicant: SAP SE, Walldorf (DE)

(72) Inventors: Atreya Biswas, Bangalore (IN); Denny Jee King Gee, Singapore (SG); Srivatsan Santhanam, Bangalore (IN)

(73) Assignee: SAP SE, Walldorf (DE)

( * ) Notice: Subject to any disclaimer, the term of this patent is extended or adjusted under 35 U.S.C. 154(b) by 1018 days.

(21) Appl. No.: 17/203,921

(22) Filed: Mar. 17, 2021

(65) Prior Publication Data

US 2022/0300754 A1    Sep. 22, 2022

(51) Int. Cl.
```
G06F 18/20     (2023.01)
G06F 18/21     (2023.01)
G06N 20/00     (2019.01)
G06V 10/75     (2022.01)
```

(52) U.S. Cl.
CPC ........ *G06F 18/285* (2023.01); *G06F 18/2178* (2023.01); *G06N 20/00* (2019.01); *G06V 10/751* (2022.01)

(58) Field of Classification Search
CPC .. G06N 20/00; G06V 10/751; G06F 18/2178; G06F 18/285
See application file for complete search history.

(56) References Cited

U.S. PATENT DOCUMENTS

| | | | |
|---|---|---|---|
| 10,853,693 B2 | 12/2020 | Eberlein et al. | |
| 11,341,605 B1* | 5/2022 | Singh | H04L 67/1095 |
| 11,853,401 B1* | 12/2023 | Nookula | G06F 18/2163 |
| 2010/0242030 A1* | 9/2010 | Talbert | G06F 9/461 717/153 |
| 2012/0036339 A1* | 2/2012 | Frazier | G06F 9/4812 712/E9.016 |
| 2018/0349191 A1* | 12/2018 | Dorsey | G06F 9/5044 |
| 2019/0156247 A1* | 5/2019 | Faulhaber, Jr. | G06N 3/045 |
| 2019/0294927 A1* | 9/2019 | Guttmann | G10L 15/065 |
| 2019/0327259 A1* | 10/2019 | DeFelice | G06N 3/044 |
| 2020/0401491 A1 | 12/2020 | Mohamed et al. | |

OTHER PUBLICATIONS

Extended European Search Report in European Appln. No. 22159851.9, dated Aug. 23, 2022, 11 pages.
Office Action in European Appln. No. 22159851.9, mailed on Jan. 30, 2025, 5 pages.

* cited by examiner

*Primary Examiner* — Kyle R Stork
(74) *Attorney, Agent, or Firm* — Fish & Richardson P.C.

(57) ABSTRACT

Methods, systems, and computer-readable storage media for receiving, by a ML application executing within a cloud platform, a first inference request, the first inference request including first inference data, transmitting, by the ML application, the first inference data to the UAT system within the cloud platform, retrieving, by the UAT system, a first ML model in response to the inference request, the first ML model being in an inactive state, providing, by the UAT system, a first inference based on the first inference data using the first ML model, providing a first accuracy evaluation at least partially based on the first inference, and transitioning the first ML model from the inactive state to an active state, the first ML model being used for production in the active state.

20 Claims, 5 Drawing Sheets

USER ACCEPTANCE TEST SYSTEM FOR MACHINE LEARNING SYSTEMS

BACKGROUND

Enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using machine learning (ML) systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task).

Typically, trained ML models in the ML system can each be associated with an automation rate. In some examples, the automation rate can be used as an index representing a quality of output of a respective ML model. In general, the automation rate is determined based on a hold-out unseen dataset (i.e., a dataset that is not used for training the ML model). On the other hand, in order to verify the output of ML models, an end-user needs to gain trust in the ML models. This can be achieved by running the ML model in a test environment against data points of past validated scenarios and comparing the output of the ML model to expected output achieved in the past validated scenarios.

However, in many situations, these data points in the testing system are not large enough to represent production data of a production environment the ML model will be deployed to and are not significant enough to validate the automation rate of the ML model. That is, there is a data sparsity problem in validating trained ML models prior to deployment to production. This problem is amplified in scenarios including a wholly new ML model (e.g., as opposed to updating an existing ML model) that is to be deployed to production, because the behavior of the new ML model can be different, even if just slightly different, from a currently deployed ML model. Consequently, using the past validated scenarios that had been used to test the currently deployed ML model, can lead to failure in testing the new ML model.

SUMMARY

Implementations of the present disclosure are directed to a user acceptance test (UAT) system for selective deployment of machine learning (ML) models to production environments. More particularly, implementations of the present disclosure are directed to an automated UAT system that reduces technical overhead and improves reliability of and trust in ML models, without hampering day-to-day operations of production environments.

In some implementations, actions include receiving, by a ML application executing within a cloud platform, a first inference request, the first inference request including first inference data, transmitting, by the ML application, the first inference data to the UAT system within the cloud platform, retrieving, by the UAT system, a first ML model in response to the inference request, the first ML model being in an inactive state, providing, by the UAT system, a first inference based on the first inference data using the first ML model, providing a first accuracy evaluation at least partially based on the first inference, and transitioning the first ML model from the inactive state to an active state, the first ML model being used for production in the active state. Other implementations of this aspect include corresponding systems, apparatus, and computer programs, configured to perform the actions of the methods, encoded on computer storage devices.

These and other implementations can each optionally include one or more of the following features: actions further include generating, by the ML application, a second inference based on the first inference data using a second ML model in parallel with generating the first inference, the second ML model being in the active state, and replacing the second ML model with the first ML model for subsequent production use in response to transitioning the first ML model to the active state; the first ML model is an updated version of the second ML model; the first accuracy evaluation includes determining an accuracy of the first ML model that represents correct inferences of the first ML model, and comparing the accuracy of the first ML model to a threshold accuracy; providing a first accuracy evaluation is executed in response to occurrence of a polling condition; the first inference data includes production data; and actions further includes retrieving, by the UAT system, a second ML model in response to a second inference request, the second ML model being in an inactive state, providing, by the UAT system, a second inference based on second inference data of the second inference request using the second ML model, determining a second accuracy evaluation at least partially based on the second inference, and transmitting an alert regarding the second ML model in response to the second accuracy evaluation.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to a user acceptance test (UAT) system for selective deployment of machine learning (ML) models to production environments. More particularly, implementations of the present disclosure are directed to an automated UAT system that reduces technical overhead and improves reliability of and trust in ML models, without hampering day-to-day operations of production environments. In some implementations, actions can include receiving, by a ML application executing within a cloud platform, a first inference request, the first inference request including first inference data, transmitting, by the ML application, the first inference data to the UAT system within the cloud platform, retrieving, by the UAT system, a first ML model in response to the inference request, the first ML model being in an inactive state, providing, by the UAT system, a first inference based on the first inference data using the first ML model, providing a first accuracy evaluation at least partially based on the first inference, and transitioning the first ML model from the inactive state to an active state, the first ML model being used for production in the active state.

To provide further context for implementations of the present disclosure, and as introduced above, enterprises have embarked on the journey of so-called intelligent enterprise, which includes automating tasks executed in support of enterprise operations using machine learning (ML) systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task). The output of the ML model is then used in one or more subsequent tasks (e.g., clearing invoices based on ML-based matching of invoices to bank statements).

Typically, trained ML models in the ML system can each be associated with an automation rate. In some examples, the automation rate can be used as an index representing a quality of output of a respective ML model. In some examples, the automation rate can be determined as a percentage of the tasks completed by the ML system with zero errors and without any human intervention. In general, the automation rate is determined based on a hold-out dataset (i.e., a dataset that is not used for training the ML model). On the other hand, in order to verify the output of ML models, an end-user needs to gain trust in the ML models. This can be achieved by running the ML model in a test environment against data points of past validated scenarios and comparing the output of the ML model to expected output achieved in the past validated scenarios.

Generally, testing of a software system can be considered as straightforward. For example, the testing can be formulated as setting an output for a defined input and determining whether the output is as expected for the input. However, with the advent of software systems using ML models, a software system does not always produce a deterministic output for an input and, in fact, the result can be sometimes incorrect. Usually the testing of ML systems occurs during the training phase of each ML model, where the ML model outputs an accuracy and other metrics (e.g., automation rate) based on a hold-out dataset.

With regard to training of a ML model, a dataset that is to be used to train the ML model can be divided into multiple parts: training data, testing data, and validation data. The training data and the testing data are used to train the ML model. Because the training data and testing data are used to train the ML model, the training data and testing data can be referred to as data that has been "seen" by the ML model. After the training phase is complete, validity, or usefulness, of the (trained) ML model can be evaluated by using the validation data. Here, because the validation data was not used during training, the validation data can be referred to as data that is "unseen" with respect to the ML model.

However, in many situations, the number of data points represented in the validation data is not large enough to comprehensively represent production data that is to be seen in a production environment that the ML model will be deployed to and are not significant enough to validate the ML model. That is, there is a data sparsity problem in validating trained ML models prior to deployment to production. This problem is amplified in scenarios including a wholly new ML model (e.g., as opposed to updating an existing ML model) that is to be deployed to production, because the behavior of the new ML model can be different, even if just slightly different, from a currently deployed ML model. Consequently, using the past validated scenarios that had been used to test the currently deployed ML model, can lead to failure in testing the new ML model.

In view of the above context, and as introduced above, implementations of the present disclosure provide a UAT system for selective deployment of ML models to production environments. More particularly, implementations of the present disclosure are directed to an automated UAT system that reduces technical overhead and improves reliability of and trust in ML models, without hampering day-to-day operations of production environments. As described in further detail herein, the UAT system of the present disclosure provides passive evaluation of ML models in parallel with a production environment before promoting the ML models to an active state for use in the production environment. The UAT system of the present disclosure enables a set of benchmarks to be customized by users to reliably (from the perspective of the users) run inferences with the ML models and seamlessly transition ML models into the active state.

Implementations of the present disclosure are described in further detail with reference to example use cases. It is contemplated, however, that implementations of the present disclosure can be realized in any appropriate use case. In some examples, the ML system (executing one or more ML models) is a greenfield ML system. A greenfield ML system can be described as a ML system with no prior ML implementation and is installed with the ML models from scratch to automate one or more tasks in operations of an enterprise. In some examples, the ML system (executing one or more ML models) is a brownfield ML system. A brownfield ML system can be described as a ML system that has been executing for some period of time and one or more of the ML models will each be upgraded from an existing ML model to a new ML model.

Figure 1:
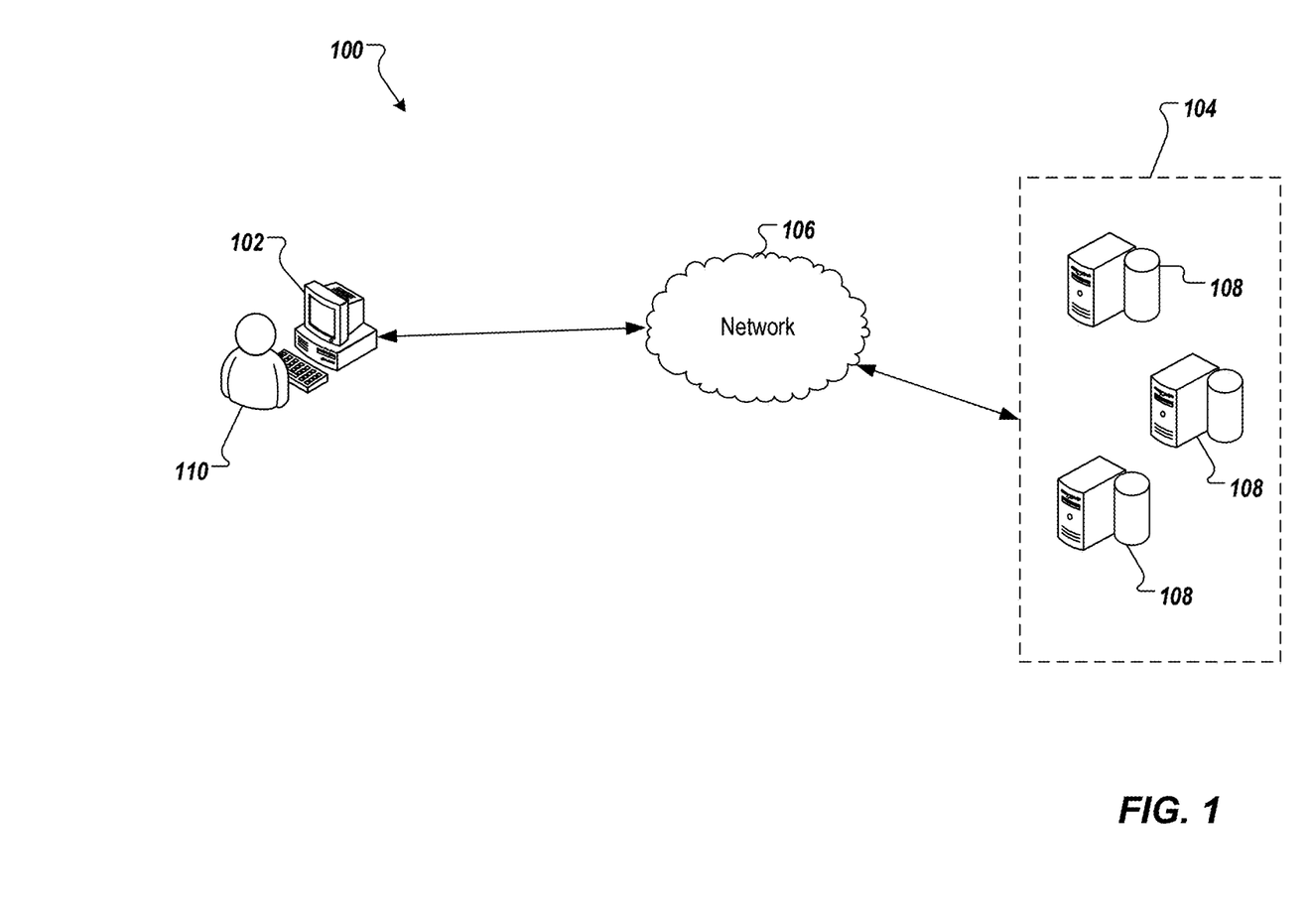
FIG. 1 depicts an example architecture in accordance with implementations of the present disclosure.

FIG. 1 depicts an example architecture 100 in accordance with implementations of the present disclosure. In the depicted example, the example architecture 100 includes one or more client devices 102, a server system 104, and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors, e.g., central processing units (CPUs), over a memory bus. An-memory database can be contrasted with database management systems that employ a disk storage mechanism. In some examples, in-memory databases are faster than disk storage databases, because internal optimization algorithms can be simpler and execute fewer CPU instructions, e.g., require reduced CPU consumption. In some examples, accessing data in an in-memory database eliminates seek time when querying the data, which provides faster and more predictable performance than disk-storage databases.

Implementations of the present disclosure are described in further detail herein with reference to an example context. The example context includes applications that are executed in a client-server architecture, such as the example architecture 100 of FIG. 1. In some examples, applications can be provided in a software suite that includes two or more applications. The applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context (e.g., healthcare applications). In some examples, the applications can be executed within a platform. An example platform can include, without limitation, S/4HANA, provided by SAP SE of Walldorf, Germany.

In some implementations, the server system 104 can host a UAT system of the present disclosure. For example, and as described in further detail herein, in response to an inference request, the UAT system enables a UAT ML model to execute inferencing in an inactive mode (i.e., non-production) to provide inference results. That is, in the inactive mode, while the UAT ML model generates inference results, the inference results are limited to use in evaluating the UAT ML model and are not used in performing tasks underlying operations of an enterprise. The inference results can be evaluated (e.g., after a threshold number of days, after a threshold number of inference results) to selectively transition the UAT ML model to an active mode. For example, an accuracy evaluation can be provided based on the inference results. If the accuracy evaluation indicates that the UAT ML model is sufficiently accurate, while in the inactive mode, the UAT ML model can be transitioned to an active mode for subsequent production use. That is, in the active mode, inference results of the UAT ML model will be used in performing tasks underlying operations of an enterprise. This can be representative of a greenfield scenario, in which no ML model precedes the UAT ML model in the production environment.

In some implementations, a ML model of a ML system is also responsive to inference requests to generate inference results in parallel with the UAT system. More particularly, the ML model is in the active state and generates inference results for production use (e.g., the inference results are used in performing tasks underlying operations of an enterprise). In some examples, the accuracy evaluation of the UAT ML model can be at least partially based on the inference results of the UAT ML model and the inference results of the ML model. For example, it can be determined that an accuracy of the UAT ML model exceeds an accuracy of the ML model and, in response, the UAT ML model can be transitioned to the active model and replace the ML model in subsequent production use. This can be representative of a brownfield scenario, in which the ML model precedes the UAT ML model in the production environment, the UAT ML model replacing the ML model (e.g., the UAT model is an updated version of the ML model).

In some implementations, if the accuracy evaluation of the UAT ML model indicates inadequate performance of the UAT ML model, an alert can be issued. For example, the user 110 can be alerted to deficiency of the UAT ML model and, in response, can investigate and correct (e.g., change the UAT ML model, re-train the UAT ML model, etc.).

Figure 2:
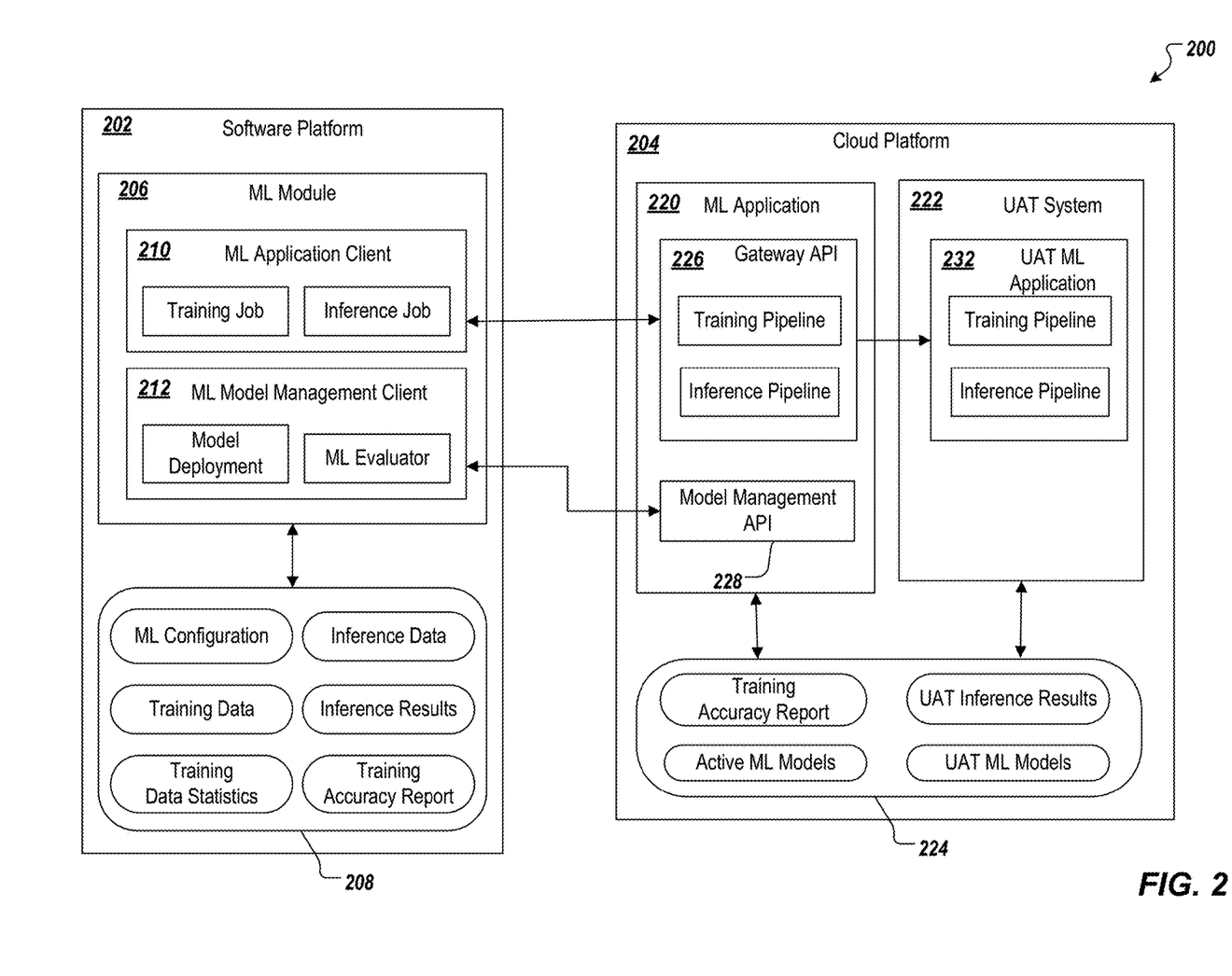
FIG. 2 depicts a conceptual architecture in accordance with implementations of the present disclosure.

FIG. 2 depicts a conceptual architecture 200 in accordance with implementations of the present disclosure. In the example shown in FIG. 2, the conceptual architecture 200 includes a software platform 202 and a cloud platform 204. In a non-limiting example, the software platform 202 can be provided as S/4HANA, which can be described as an ERP platform with built-in intelligent technologies including ML, S/4HANA running on SAP HANA, an in-memory database system. In a non-limiting example, the cloud platform 204 can be provided as SAP Cloud Platform, provided by SAP SE of Walldorf, Germany. SAP Cloud Platform can be described as a cloud platform for creating and deploying cloud-based applications. In some examples, the software system 202 and the cloud platform 204 communicate over a network (e.g., the network 106 of FIG. 1).

In further detail, the software platform 202 includes a ML module 206 and a data store 208. In some examples, the ML module 206 can be an ERP module that is configured for the communication with a ML service executed on the cloud platform 204. The ML module 206 includes a ML application client 210 and a ML model management client 212. The ML application client 210 executes training jobs and inference jobs that extract and push training data and inference data stored in the data store 208 to the cloud platform 204. More particularly, the ML application client 210 can initiate training of one or more ML models in the cloud platform 204 and provide training data that is to be used for training the one or more ML models. For any trained ML models, the ML application client 210 can initiate inferencing and provide inference data to be used for inferencing. Inferencing can be described as the process of a ML model generating an output (e.g., prediction) based on input (e.g., inference data). In some examples, the ML application client 210 is also configured to receive training artifacts (e.g., training data statistics) and the inference results (e.g., the prediction results), and persist these in the data store 208.

In some examples, the ML model management client 212 is configured to manage a lifecycle of the ML models for use in the ML service executed in the cloud platform 222. As described in further detail herein, the ML model management client 212 evaluates the effectiveness of the training accuracy and inference results for respective ML models trained and executed by the ML service, and selectively transitions ML models to active state or inactive state within the cloud platform 204. As depicted in FIG. 2, the ML model management client 212 includes a ML model deployment sub-module and a ML evaluator sub-module.

Examples of data persisted in the data store 208 include, but are not limited to, ML configuration data, training data, training data statistics, training accuracy reports, inference data, and inference results. In some examples, the ML configuration data can include the configuration information that is used for executing the client application 202. For example, time schedules of executing the ML evaluation is stored as one of the configuration information in the ML configuration. The training data can be extracted data or historical data required for the machine learning service to train the ML models. The training data statistics can be analysis reports of the training data extracted for the ML service. The training accuracy reports can be provided as benchmark reports produced as a training artifact from the ML service. In some examples, accuracy of a ML model use by the ML service can be derived based on the training accuracy report. The inference data can be data extracted for the inferences executed by the ML service. The inference results are the prediction results output by the cloud platform 204 in response to the input of the inference data.

In the example of FIG. 2, the cloud platform 204 includes a ML application 220, a UAT system 222, and a database 224. The ML application 220 communicates with the ML application client 210 of the ML module 206. In some examples, the ML application 220 embodies a ML service for facilitating training jobs and inference jobs. In some examples, the ML application 220 can be provided as a consumable application interface (API) that receives requests from and provides responses to the software platform 202.

As depicted in FIG. 2, the ML application 220 includes a gateway API 226 and a model management API 228. The gateway API 226 functions as an abstract layer and provides a single point of entry to route requests (e.g., training requests, prediction requests) into training pipelines and inference pipelines, respectively, and the UAT system 222. In further detail, in response to a training job, a training pipeline of the ML application 220 ingests training data (e.g., received from the ML application client 210) and executes training to provide a (trained) ML model. The training pipeline also provides a training accuracy report, which provides an accuracy score indicating an accuracy of the ML model as determined through training. The ML model and the training accuracy report can be stored in the database 224. In response to an inference job, an inference pipeline of the ML application 220 retrieves a ML model from the database 224 and ingests inference data (e.g., received from the ML application client 210) to generate inference results (e.g., output of the ML model). Here, the ML model retrieved by the ML application 220 is in the active state, such that the inference results generated by the ML model are used in one or more tasks of operations of an enterprise.

In some implementations, the model management API 228 is configured to manage the ML models used by the ML application 220. For example, the model management API 228 can persist ML models (active state) and UAT ML models (inactive state) in the database 224. In some examples, the model management API 228 can be configured to query the ML models and retrieve one or more ML models in the active state from the database 224 for use in the inference pipeline (e.g., query the database 224 for a ML model and provide the ML model for inference by the ML application 220).

In accordance with implementations of the present disclosure, the UAT system 222 functions as a staging environment for new and/or updated ML models, referred to as UAT ML models. The UAT ML models are each in an inactive state (non-production use) prior to the UAT ML models being switched to an active state (production use). In the example of FIG. 2, the UAT system 222 includes a UAT ML application 232. The UAT ML application 232 includes a training pipeline and an inference pipeline that execute as similarly described above with respect to those of the ML application 220 except that, in the inference pipeline, the inference results generated by the UAT ML models are not for production use. Instead, the inference results of the UAT ML models are used to evaluate the UAT ML models to selectively transition one or more of the UAT ML models to the active state.

In accordance with implementations of the present disclosure, the UAT system 222 operates in a passive mode in parallel with production use of the ML application 220. That is, in response to an inference request, the ML application 220 retrieves a ML model (active state) to provide an inference result that can be used in one or more tasks of operations of the enterprise. The ML application 220 provides at least a portion of the inference request to the UAT ML application 232, which retrieves a UAT ML model (inactive state) to provide an inference result that can be used to evaluate the UAT ML model. In some examples, evaluation of the UAT ML model can include determining an accuracy of the UAT ML model and comparing the accuracy to a threshold accuracy. Accordingly, implementations of the present disclosure enable the UAT ML model to generate inference results based on production data (i.e., inference data) from a production environment, while not impacting the production environment.

In some implementations, the ML evaluator of the ML model management client 212 can retrieve training accuracy reports and the inference results from the database 224 of the cloud platform 204. In some examples, the ML model management client 212 can evaluate the accuracy of the UAT ML model based on the training accuracy report and/or the inference results. If the performance of the UAT ML model (e.g., training accuracy and/or the inference results) is determined to be sufficient (e.g., exceeds a predetermined threshold), the UAT ML model is transitioned to the active state. For example, the ML model management client 212 can send instructions to the model management API 228 to transitions the UAT ML model to the active state, such that it is available for production use. That is, the UAT ML model, now as an active state ML model, can be used by the ML application 220 to generate inference results for production use. In some examples, of the performance of the UAT ML model is determined to be insufficient (e.g., does not exceed the predetermined threshold), an alert can be issued and the UAT ML model can be addressed (e.g., redesigned, re-trained).

In some examples, a greenfield ML system is considered, in which no prior ML model is deployed. In the greenfield scenario, the predetermined threshold for the evaluation of the UAT ML model can be set by a user, such as a customized set of benchmarks on the basis of, for example, historical statistics. In some examples, a brownfield ML system is considered, in which the UAT ML model is to replace a ML model currently deployed for production use (e.g., the UAT ML model is an updated version of the ML model). In the brownfield scenario, the ML evaluator of the ML model management client 212 can generate the training accuracy report based on the training result and the inference result output by the ML application 224. The training accuracy report of the currently-deployed ML model can be taken as the basis of the predetermined threshold for the evaluation of the UAT model. For example, an accuracy of the currently-deployed ML model (or a percentage above) can be taken as the predetermined threshold.

Figure 3:
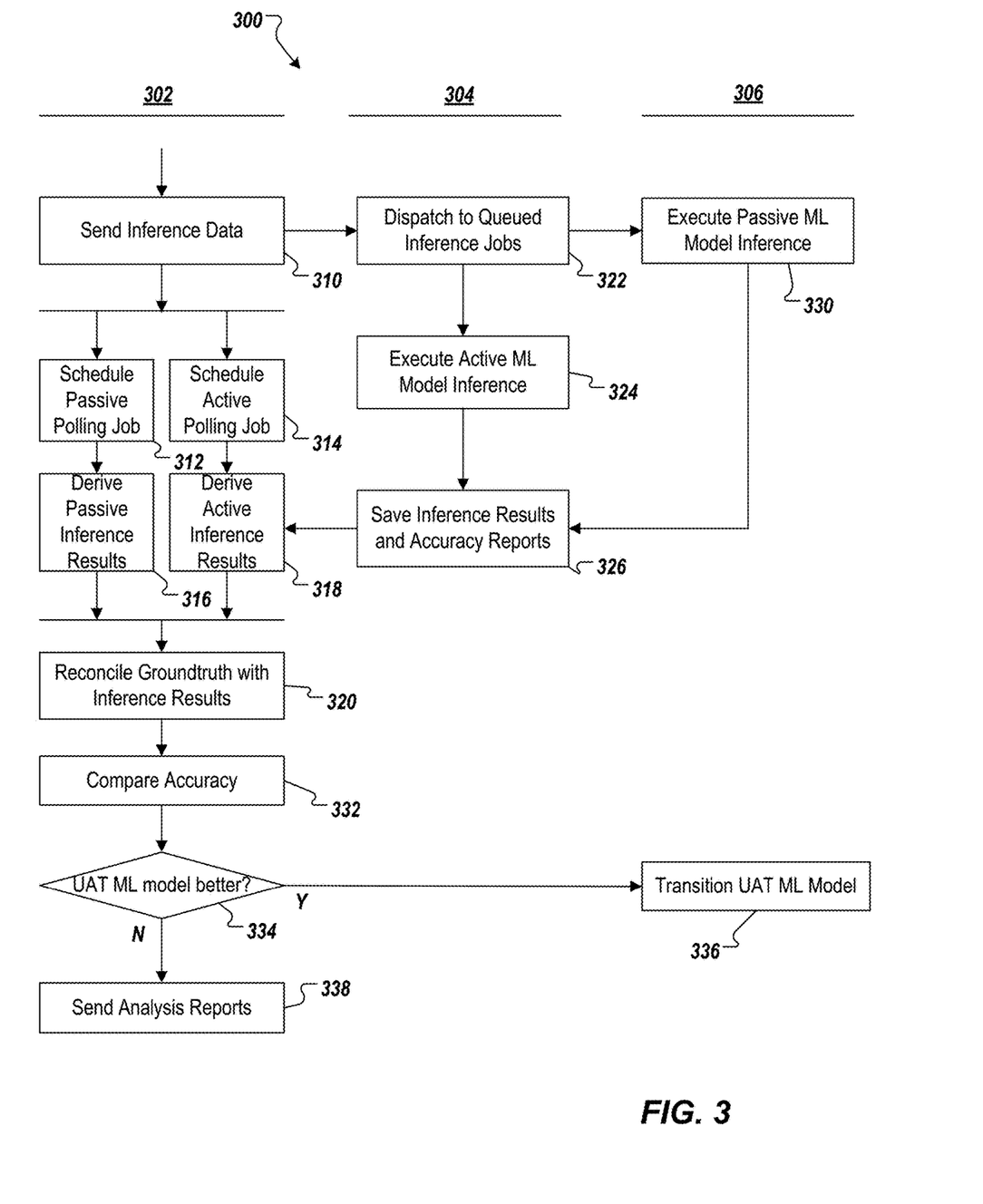
FIG. 3 depicts an example process that can be executed in accordance with implementations of the present disclosure.

FIG. 3 depicts an example process 300 that can be executed in accordance with implementations of the present disclosure. In the example of FIG. 3, portions of the process 300 can be executed in parallel across a software platform 302 (e.g., the software platform 302 of FIG. 2), a ML application 304 (e.g., the ML application 220 of FIG. 2), and a UAT system 306 (e.g., the UAT system 222 of FIG. 2). In the example, of FIG. 3, the brownfield scenario is considered. More particularly, the ML application 304 is associated with a currently-deployed ML model, and the UAT ML model used in the UAT system 304 is to replace the currently-deployed ML model.

In the example of FIG. 3, inference data is prepared at the software platform 302 and is sent (310) to the ML application 304 (e.g., sent the ML application client 210 to the ML application 220 of FIG. 2). In some examples, the inference data is received from a production environment and includes production data. The ML application 304 dispatches (322) the inference data to inference jobs as well as to the UAT system 306. The ML application 304 executes (324) active ML model inference to generate inference results that will be used for production. For example, the ML application 304 loads a ML model, provides the inference data as input to the ML model, and the ML model processes the input to provide inference results as output. The UAT system 306 executes (330) passive ML model inference to generate inference results that will be used for evaluation. For example, the UAT system 306 loads a UAT ML model, provides the inference data as input to the UAT ML model, and the UAT ML model processes the input to provide inference results as output. The inference results of each of the ML application 304 and the UAT system 320 are stored and accuracy reports are provided (326).

In some examples, the execution of the active ML model inference has higher priority than the execution of the passive UAT ML model inference. Namely, the passive inference can be interrupted or postponed if the computing resources of the cloud platform are limited. When both the active inference and the passive inference are complete, the training accuracy reports of both the currently-deployed ML model and the UAT ML model can be provided.

Independent of processing inference data, a passive polling job and an active polling job are scheduled (312, 314) by the software platform 302. In some examples, at a polling time (e.g., threshold period of time has expired, threshold number of inferences have been executed), respective derivations (316, 318) of passive inference results and active inference results. That is, for example, inference results for the UAT ML model (inactive state) are retrieved from a data store and inference results for the ML model (active state) are retrieved from a data store. In some examples, a ground truth is reconciled (320) with the inference results from both active inference and the passive model inference. For example, it can be determined whether an inference result was correct by comparing the inference result to a ground truth, the ground truth representing the expected inference result in view of respective input. An accuracy of each of the ML model and the UAT ML model can be determined, for example, as a ratio of a number of correct inference results to a total number of inference results for the respective model.

The accuracy of the ML model is compared (332) to the accuracy of the UAT ML model. Based on the comparison if it is determined (334) that the UAT ML model is better (e.g., more accurate), the UAT ML model is transitioned as the active model (336). On the other hand, if it is determined (334) that the UAT ML model is not better, an analysis report is generated based on the determination and can be sent to the operation team of the software system (338). The operation team can resolve the issue as appropriate (e.g., revise the UAT ML model, re-train the UAT ML model).

Figure 4:
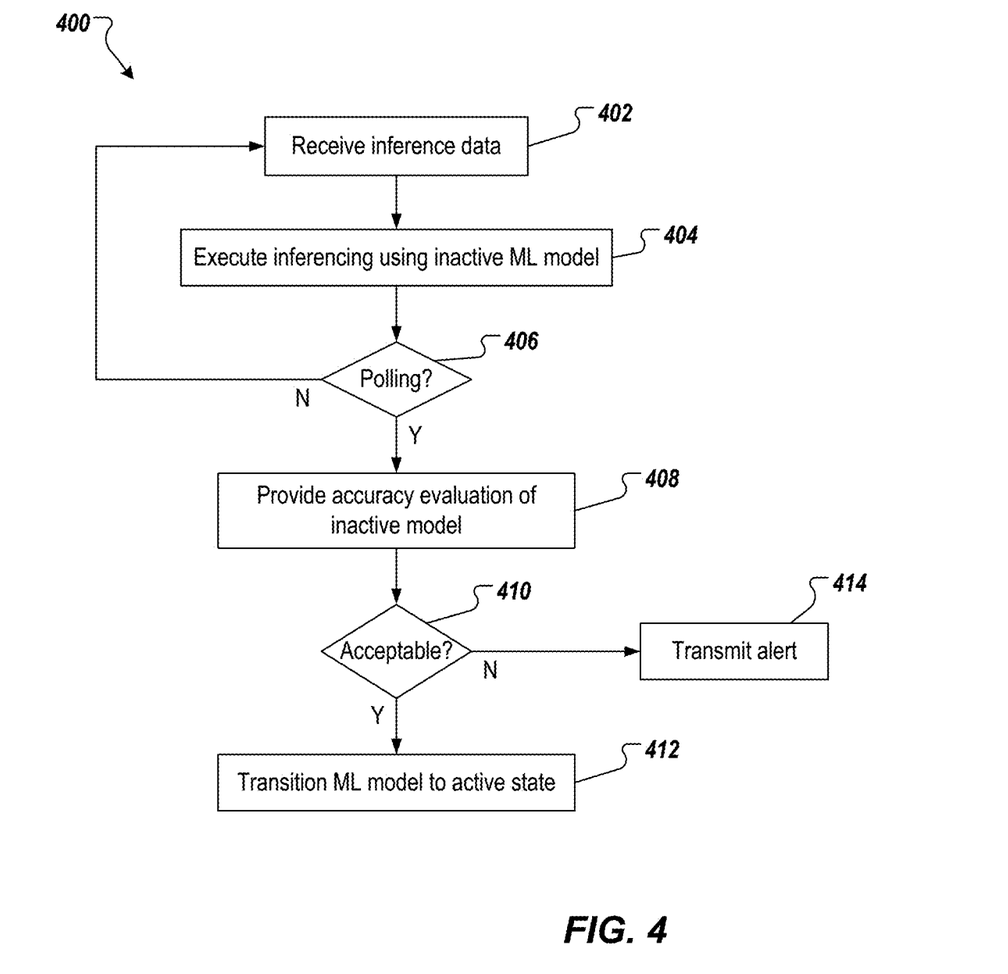
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices. The example process 400 is at least partially executed by a UAT system for selectively transitioning ML models from an inactive state to an active state.

Inference data is received (402). For example, and as described herein, inference data is received by the ML application 220 from the ML application client of FIG. 2. In some examples, the inference data is included in an inference request and includes production data (i.e., data that is generated by, or otherwise received from a software system executing in production to perform one or more tasks in support of operations of an enterprise). Inferencing is executed using an inactive ML model (404). For example, and as described herein, the inference data is provided to the UAT system 222, which loads a respective UAT ML model, provides input to the UAT ML model (e.g., the input including at least a portion of the inference data), and receives output of the UAT ML model (e.g., an inference output by the UAT ML model). In some examples, which UAT ML model that is to be loaded is at least partially determined based on an identifier received with the inference request. For example, the identifier can identify an application, a system, a user, and/or an enterprise, for which inferencing is to be executed, and the UAT ML model can be selected for use from a set of UAT ML models based on the identifier.

In some examples, inferencing is also executed using an active ML model (i.e., for production use of inference results) in response to the inference request. For example, and as described herein, the ML application 220 can load a respective ML model, provides input to the ML model (e.g., the input including at least a portion of the inference data), and receives output of the ML model (e.g., an inference output by the ML model). In some examples, which ML model that is to be loaded is at least partially determined based on the identifier received with the inference request, the ML model being selected for use from a set of ML models based on the identifier. In some examples, inferencing executed using the active ML model is performed in parallel with that using the UAT ML model. Here, parallel generally refers to both the ML model and the UAT ML model using the same inference data (i.e., at least a portion of the inference data received with the inference request). As described herein, parallel can include the ML model executing inferencing prior to the UAT ML model, the ML model and the UAT ML model executing inferencing at substantially the same time (e.g., inferencing at least partially overlaps in time), or the ML model executing inferencing after the UAT ML model.

It is determined whether a polling condition has been met (406). For example, it can be determined whether a threshold number of days has passed since the UAT ML model has been executing inferences in the inactive mode. As another example, it can be determined whether the UAT ML model has executed a threshold number of inferences in the inactive mode. If the polling condition has not been met, the example process 400 loops back to continue inferencing.

If the polling condition has been met, an accuracy evaluation of the UAT ML model is provided (408). For example, and as described herein, the ML model management client 212 evaluates the UAT ML model based on inference results provided by the UAT ML model, while in the inactive mode. It is determined whether the accuracy evaluation indicates that the performance of the UAT ML model is acceptable (410). For example, and as described herein, the performance of the UAT ML model can be determined to be acceptable, if an accuracy of the UAT ML model exceeds a threshold accuracy. In some examples, the threshold accuracy is a value provided by a user (e.g., in a set of benchmarks). In some examples, the threshold accuracy is equal to or is a percentage of (e.g., 105%) of an accuracy of the ML model that is executing in the active mode (e.g., the ML model that the UAT ML model is expected to replace). If the performance of the UAT ML model is acceptable, the UAT ML model is transitioned to the active state (412). For example, the UAT ML model is promoted as a ML model in the active state and is stored in the data store 224 for subsequent use by the ML application 220 in production inferencing. If the performance of the UAT ML model is not acceptable, an alert is transmitted (414). For example, an alert can be transmitted to a user and, in response, the user can investigate the UAT ML model (e.g., revise the UAT ML model, re-train the UAT ML model).

Figure 5:
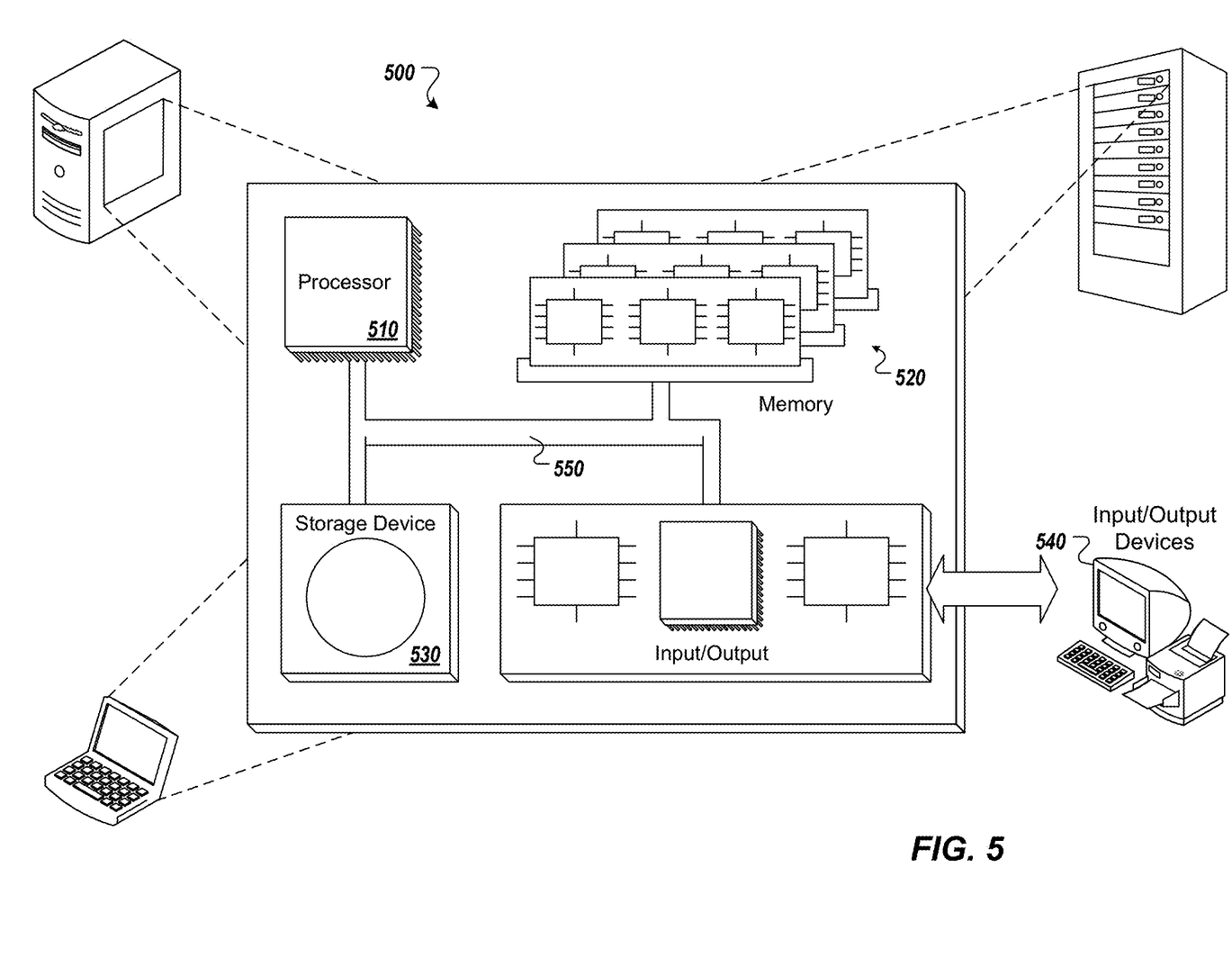
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for selectively deploying machine learning (ML) models to production using a user acceptance test (UAT) system, the method comprising:
   receiving, by a ML application executing within a cloud platform, a first inference request, the first inference request comprising first inference data and an identifier that identifies one or more of an application, a system, a user, and an enterprise for which inferencing is to be executed;
   transmitting, by the ML application, the first inference data to the UAT system within the cloud platform;
   retrieving, by the UAT system, a first ML model from a set of ML models, the first ML model being associated with the identifier and being specific to the one or more of the application, the system, the user, and the enterprise, the first ML model being in an inactive state, in which the first ML model is not in production use to perform enterprise operations;
   postponing execution of a passive inference using the first ML model and the first inference data until completion of an active inference using the first inference data, the postponing being in response to availability of computing resources for executing the passive inference and the active inference;
   providing, as the passive inference and by the UAT system, a first inference based on the first inference data using the first ML model;
   providing a first accuracy evaluation at least partially based on the first inference; and
   transitioning the first ML model from the inactive state to an active state, the first ML model being used for production in the active state, in which the first ML model is in production use to perform enterprise operations.

2. The method of claim 1, further comprising:
   generating, by the ML application, a second inference based on the first inference data using a second ML model in parallel with generating the first inference, the second ML model being in the active state; and
   replacing the second ML model with the first ML model for subsequent production use in response to transitioning the first ML model to the active state.

3. The method of claim 2, wherein the first ML model is an updated version of the second ML model.

4. The method of claim 1, wherein the first accuracy evaluation comprises:
   determining an accuracy of the first ML model that represents correct inferences of the first ML model; and
   comparing the accuracy of the first ML model to a threshold accuracy.

5. The method of claim 1, wherein providing a first accuracy evaluation is executed in response to occurrence of a polling condition.

6. The method of claim 1, wherein the first inference data comprises production data.

7. The method of claim 1, further comprising:
   retrieving, by the UAT system, a second ML model in response to a second inference request, the second ML model being in an inactive state;
   providing, by the UAT system, a second inference based on second inference data of the second inference request using the second ML model;
   determining a second accuracy evaluation at least partially based on the second inference; and
   transmitting an alert regarding the second ML model in response to the second accuracy evaluation.

8. A non-transitory computer-readable storage medium coupled to one or more processors and having instructions stored thereon which, when executed by the one or more processors, cause the one or more processors to perform operations for selectively deploying machine learning (ML) models to production using a user acceptance test (UAT) system, the operations comprising:
   receiving, by a ML application executing within a cloud platform, a first inference request, the first inference request comprising first inference data and an identifier that identifies one or more of an application, a system, a user, and an enterprise for which inferencing is to be executed;
   transmitting, by the ML application, the first inference data to the UAT system within the cloud platform;
   retrieving, by the UAT system, a first ML model from a set of ML models, the first ML model being associated with the identifier and being specific to the one or more of the application, the system, the user, and the enterprise, the first ML model being in an inactive state, in which the first ML model is not in production use to perform enterprise operations;
   postponing execution of a passive inference using the first ML model and the first inference data until completion of an active inference using the first inference data, the postponing being in response to availability of computing resources for executing the passive inference and the active inference;

providing, as the passive inference and by the UAT system, a first inference based on the first inference data using the first ML model;

providing a first accuracy evaluation at least partially based on the first inference; and transitioning the first ML model from the inactive state to an active state, the first ML model being used for production in the active state, in which the first ML model is in production use to perform enterprise operations.

9. The non-transitory computer-readable storage medium of claim 8, wherein operations further comprise:

generating, by the ML application, a second inference based on the first inference data using a second ML model in parallel with generating the first inference, the second ML model being in the active state; and replacing the second ML model with the first ML model for subsequent production use in response to transitioning the first ML model to the active state.

10. The non-transitory computer-readable storage medium of claim 9, wherein the first ML model is an updated version of the second ML model.

11. The non-transitory computer-readable storage medium of claim 8, wherein the first accuracy evaluation comprises:

determining an accuracy of the first ML model that represents correct inferences of the first ML model; and comparing the accuracy of the first ML model to a threshold accuracy.

12. The non-transitory computer-readable storage medium of claim 8, wherein providing a first accuracy evaluation is executed in response to occurrence of a polling condition.

13. The non-transitory computer-readable storage medium of claim 8, wherein the first inference data comprises production data.

14. The non-transitory computer-readable storage medium of claim 8, wherein operations further comprise:

retrieving, by the UAT system, a second ML model in response to a second inference request, the second ML model being in an inactive state;

providing, by the UAT system, a second inference based on second inference data of the second inference request using the second ML model;

determining a second accuracy evaluation at least partially based on the second inference; and transmitting an alert regarding the second ML model in response to the second accuracy evaluation.

15. A system, comprising:

a computing device; and a computer-readable storage device coupled to the computing device and having instructions stored thereon which, when executed by the computing device, cause the computing device to perform operations for selectively deploying machine learning (ML) models to production using a user acceptance test (UAT) system, the operations comprising:

receiving, by a ML application executing within a cloud platform, a first inference request, the first inference request comprising first inference data and an identifier that identifies one or more of an application, a system, a user, and an enterprise for which inferencing is to be executed;

transmitting, by the ML application, the first inference data to the UAT system within the cloud platform;

retrieving, by the UAT system, a first ML model from a set of ML models, the first ML model being associated with the identifier and being specific to the one or more of the application, the system, the user, and the enterprise, the first ML model being in an inactive state, in which the first ML model is not in production use to perform enterprise operations;

postponing execution of a passive inference using the first ML model and the first inference data until completion of an active inference using the first inference data, the postponing being in response to availability of computing resources for executing the passive inference and the active inference;

providing, as the passive inference and by the UAT system, a first inference based on the first inference data using the first ML model;

providing a first accuracy evaluation at least partially based on the first inference; and transitioning the first ML model from the inactive state to an active state, the first ML model being used for production in the active state, in which the first ML model is in production use to perform enterprise operations.

16. The system of claim 15, wherein operations further comprise:

generating, by the ML application, a second inference based on the first inference data using a second ML model in parallel with generating the first inference, the second ML model being in the active state; and replacing the second ML model with the first ML model for subsequent production use in response to transitioning the first ML model to the active state.

17. The system of claim 16, wherein the first ML model is an updated version of the second ML model.

18. The system of claim 15, wherein the first accuracy evaluation comprises:

determining an accuracy of the first ML model that represents correct inferences of the first ML model; and comparing the accuracy of the first ML model to a threshold accuracy.

19. The system of claim 15, wherein providing a first accuracy evaluation is executed in response to occurrence of a polling condition.

20. The system of claim 15, wherein the first inference data comprises production data.

* * * * *